United States Patent [19]

Klomp

[11] 4,368,049
[45] Jan. 11, 1983

[54] COUPLER ASSEMBLY JOINING A DRIVING SHAFT TO A DRIVEN SHAFT FOR CONSTANT VELOCITY TRANSMISSION

[75] Inventor: Alfred W. Klomp, Tacoma, Wash.
[73] Assignee: Exacto Inc., Tacoma, Wash.
[21] Appl. No.: 120,974
[22] Filed: Feb. 13, 1980
[51] Int. Cl.³ .............................................. F16D 3/28
[52] U.S. Cl. .................................................. 464/50
[58] Field of Search .................. 64/20, 19, 12; 464/50

[56] References Cited

U.S. PATENT DOCUMENTS

| | | | |
|---|---|---|---|
| 1,334,388 | 3/1920 | Massé | 64/20 |
| 2,485,893 | 10/1949 | Kost | 64/20 |
| 3,995,449 | 12/1976 | Doffe | 64/20 |

Primary Examiner—Charles J. Myhre
Assistant Examiner—Carl Stuart Miller
Attorney, Agent, or Firm—Roy E. Mattern, Jr.; Joseph Berenato

[57] ABSTRACT

A coupler assembly is installed between a driving shaft and a driven shaft to transmit rotary power and motion at constant velocity at all times during their relative positioning varying from zero degree in line to ninety degree angularity as selected throughout a hemisphere of possible radial shaft directions. In a preferred embodiment four pairs of yokes or links are equally spaced both radially and circumferentially about the inline centerline of the driving and driven shafts. Four yokes or links are rotatably, slidably and/or reciprocatably contained, in respect to either the driving or driven shaft, by positioning their rod ends partially confined within individual cylinders formed in an overall cylindrical body; in turn secured to either the driving or driven shaft. These four yokes or links have their cantilevered extending connectable ends, each with a pair of opposed confronting arms, and each confronting arm with a pin positioned ball, positioned for a linking interconnection to like cantilevered extending connectable ends of the four yokes or links rotatably, slidably and/or reciprocatably contained with respect to another overall cylindrical body. The final interconnection of these four yokes or links at these balls is undertaken by using hubs which are secured about the pin positioned balls of the opposed confronting arms.

4 Claims, 25 Drawing Figures

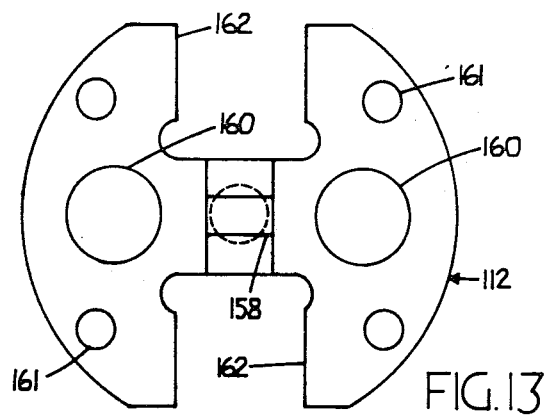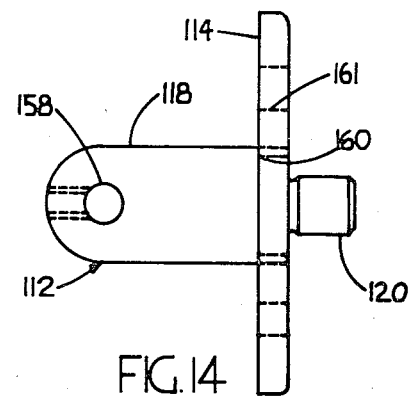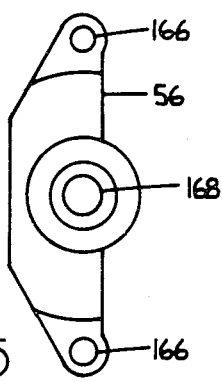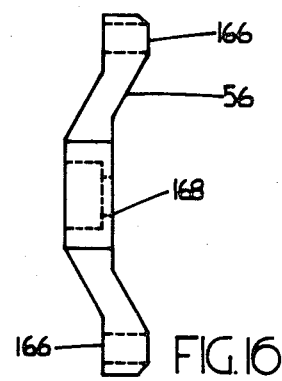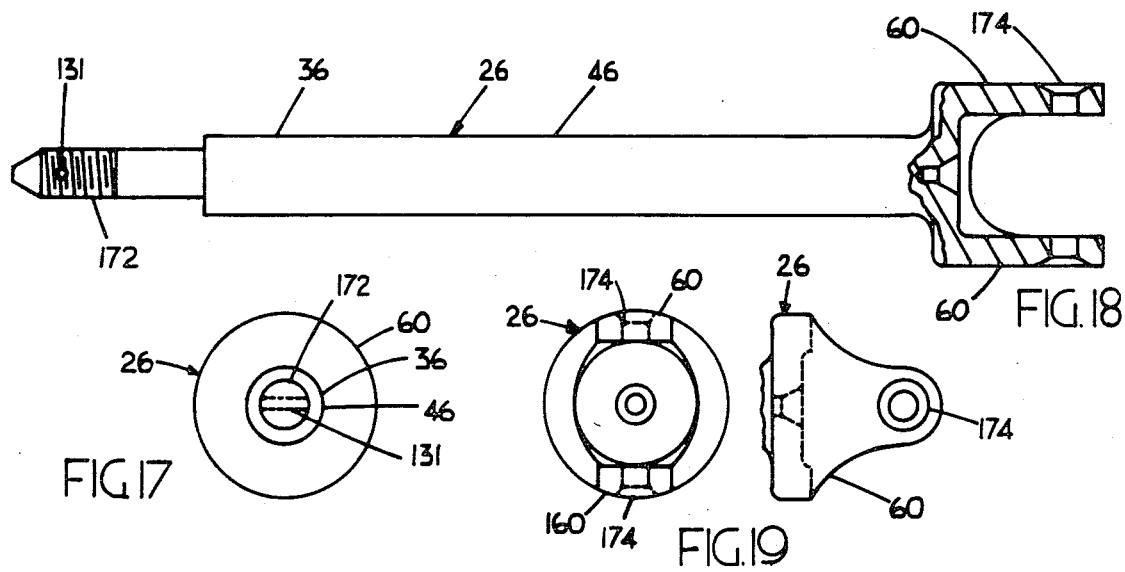

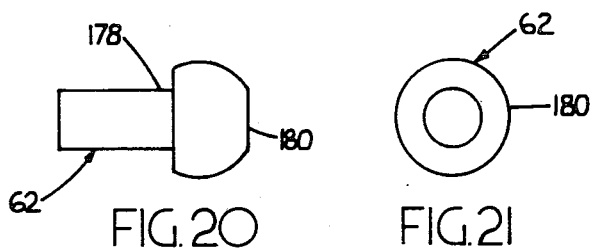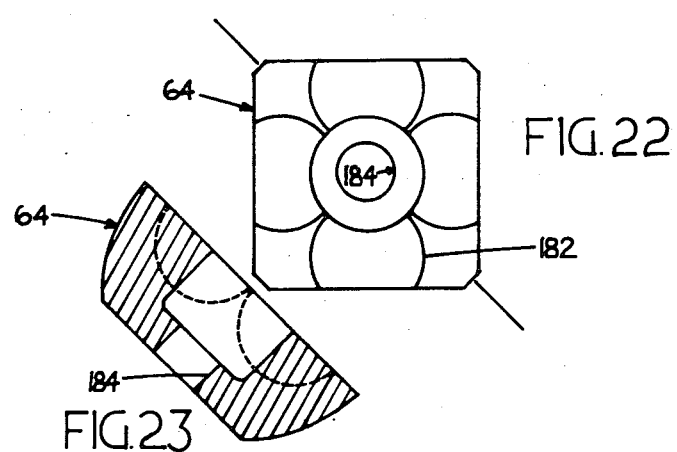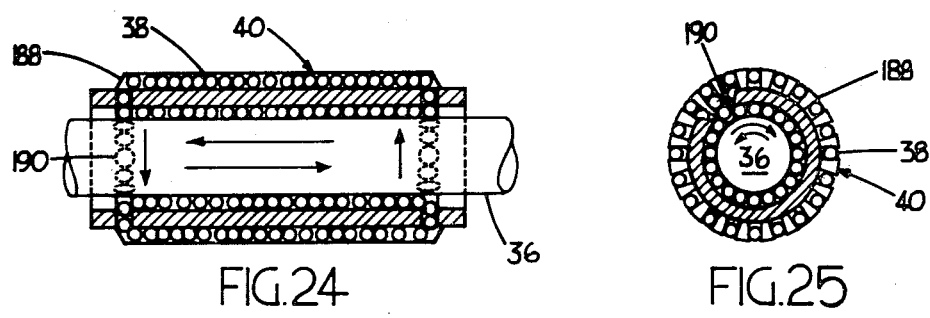

COUPLER ASSEMBLY JOINING A DRIVING SHAFT TO A DRIVEN SHAFT FOR CONSTANT VELOCITY TRANSMISSION

BACKGROUND OF THE INVENTION

Couplings are used when driving and driven shafts are to operate at one or more angular positions with respect to their intersecting centerlines during their transmission of rotary power and/or motion. Currently some of these couplings of different designs are referred to as:

a simple universal joint, often incorporating a simple cross and journal bearing and referred to as a Cardan universal joint;

a Hooke's type universal joint as disclosed in U.S. Pat. No. 3,545,232;

A block and trunnion universal joint;

a ring universal joint;

a close coupled double joint;

an elongated universal joint;

a cover and threaded stud universal joint;

a ball universal joint;

a double cardan constant velocity joint;

a Bendix universal ball joint, with the balls thereof remaining in the homokinetic geometric plane, also called the working angle bisecting plane, is referred to as a constant angular velocity joint;

a universal joint with dampening means as shown in U.S. Pat. No. 3,878,695;

a Czeppa joint;

a Rczeppa joint;

a ball and socket joint;

a Bartlett universal joint;

a constant velocity joint of the Bartlett type with two interlocking blocks;

a true-speed universal joint designed by Malton Miller having a pair of driving arms opposite each other and each being pivoted on a cross pin extending through the respective coupling sleeves attached respectively to the driving and driven sleeves, and radially spaced, from the extended centerlines of the shafts, a pair of ball and socket couplings at the respective extending ends of each driving arm;

a universal joint as disclosed by Alfred W. Klomp in U.S. Pat. No. 3,107,506 using a plurality of balls pinned to the opposing and confronting arms of the yoke members;

a shaft coupling, by Joseph A. Masse set forth in his U.S. Pat. No. 1,334,388, issued in 1920, describing and illustrating mechanism very similar to the applicant's, requiring however, a different way, via outside links, to keep the center of the universal couplings always located on a plane forming the center of rotary motion of the coupling and also to keep the coupling together;

a universal joint, by Alwin Kost, set forth in his U.S. Pat. No. 2,485,893, issued in 1949, describing and illustrating mechanism having similar objectives to the applicant's, requiring, however, different parts etc., such as the outside protruding ears secured together by coaxial pivot members, whereby the two housing members are relatively movable angularly on a common axis of pivot members, but the two housing members do not have relative universal angular movements, as they are also thus kept from separating;

a joint for the homokynetic transmission of rotary motion between two concurrent shafts by Rene Louis Doffe, set forth in his U.S. Pat. No. 3,995,449 issued in 1976, describing and illustrating mechanism having similar objectives to the applicant's, requiring, however, the outside coupling boxes with their hinges having a double articulation line, to keep the mechanism together.

Although these prior developments have merit, there still is a need for a better coupler assembly.

SUMMARY OF THE INVENTION

A coupler assembly is now available for installation between a driving shaft and a driven shaft to transmit rotary power and/or motion at a constant velocity at all times, and the angularity between the intersecting and-/or extended centerlines of these shafts is selectable throughout a hemisphere of possible radial shaft directions, i.e. up to ninety degrees of angularity. Successfully transmitting rotary power and/or motion through such a large angularity increases the versatile application of engine power in various vehicles, such as an automobile, tractor, and boat. With respect to an automobile, this coupler assembly: eliminates two drive axles; provides greater road clearance; reduces unsprung weight; removes center prop-shaft tunnel; invites independent suspension; reduces the transmitted power of each prop-shaft to one quarter of the output of the engine; and eliminates axle-housing roll caused by a pinion and ring gear. With respect to a tractor and a following agricultural machine, the power take off drive shafts connected by this coupler assembly may continue to operate at a ninety degree angularity. With respect to watercraft, the driven shaft connected by this coupler assembly is directed in many directions, inclusive of ninety degrees of angularity between the shafts, thereby positioning the propeller and the thrust thereof to obtain extensive directional control. This coupler which provides for the transmission of rotary power at constant velocity at all times, interconnects the driving and driven shafts so the latter in reference to the first is relatively positionable from a zero in line position to an extensive number of radial positions, each passing through a point on an imaginary hemisphere of possible radial driven shaft directions. The coupler assembly in a preferred embodiment utilizes four pairs of yokes or links equally spaced both radially and circumferentially about the inline centerline of the driving and driven shafts. Of the eight yokes, or links four yokes or links are rotatably, as a group, slidably and/or reciprocatably contained in respect to either the driving or driven shafts, by positioning their rod ends partially confined within individual cylinders formed in an overall cylindrical body, in turn secured to either the driving or driven shaft. With respect to the driving and driven shafts, respective paired opposite yokes or links have their cantilevered extending connectable ends, each with paired opposed confronting arms, interconnected to one another through pin positioned balls and hubs in a linking interconnection, occurring however, at a radially and circumferential spaced location. The four rod ends of the yokes or links extending beyond the individual cylinders protrude within the overall cylindrical body in a larger cylindrical volume and two of them are joined together by a rocker assembly. Throughout all of the rotary power and motion transmissions, the four linking interconnections of the yokes or links remain in a common geometrical plane, thereby assuring the constant velocity of the transmission of rotary power throughout the wide range of angularity, wherein the driven shaft is movable relative to the driving shaft throughout an imaginary hemisphere of radial directions, inclusive of ninety degree angles. Needle and ball bearings and lubricants with their seals reduce friction and wear, and interior multiple bearing balls and bearing race assemblies line the individual cylinders to receive the rod portions of the yokes or links during their combined rotary and translating motions.

DESCRIPTION OF THE DRAWINGS

A preferred embodiment is illustrated in the drawings of the coupler assembly, having four pairs of yokes or links, for installation between a driving and driven shaft to transmit rotary power and/or motion at constant velocity at all times during their relative positioning, varying from zero in line to ninety degree angularity, as selected throughout a hemisphere of possible radial shaft directions, wherein:

FIGS. 13 and 14 show the end view and side view of a flanged post, which is mounted in an overall cylindrical body serving several purposes such as pivotally supporting the rocker assembly;

FIGS. 15 and 16 illustrate respectively the side view and the end view of one of the two rocker arms of the rocker assembly, which monitors the movements of the confined yokes or links;

FIGS. 17, 18 and 19 illustrate a confined yoke or link respectively in a threaded end view, a longitudinal side view, and a confronting arms end view;

FIGS. 20 and 21 show a ball pin in a side view and an end view;

FIGS. 22 and 23 illustrate a hub in a side view and an end view; and

FIGS. 24 and 25 show the ball bearing race 40 in a longitudinal sectional view and in an end view.

DESCRIPTION OF A PREFERRED EMBODIMENT OF THE INVENTION TRANSMISSION OF ROTARY POWER AND MOTION THROUGHOUT A HEMISPHERE

Figure 1:
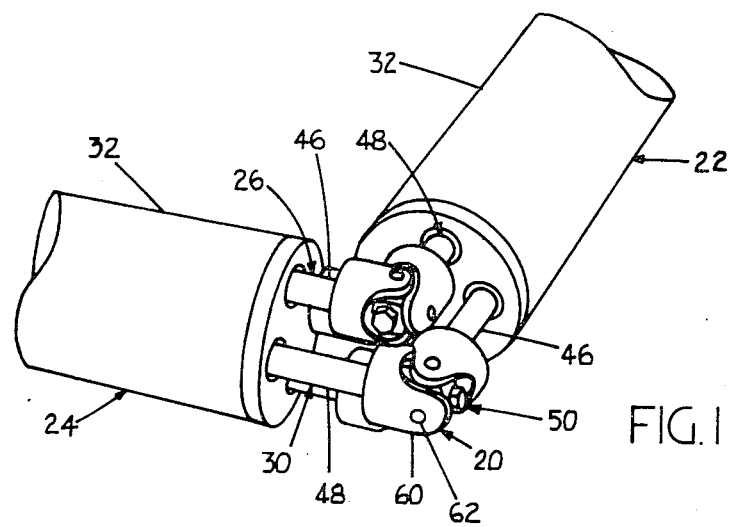
FIG. 1 is a perspective view of the coupler assembly illustrating the driving and driven shafts positioned so their extended centerlines intersect at ninety degrees.
Figure 2:
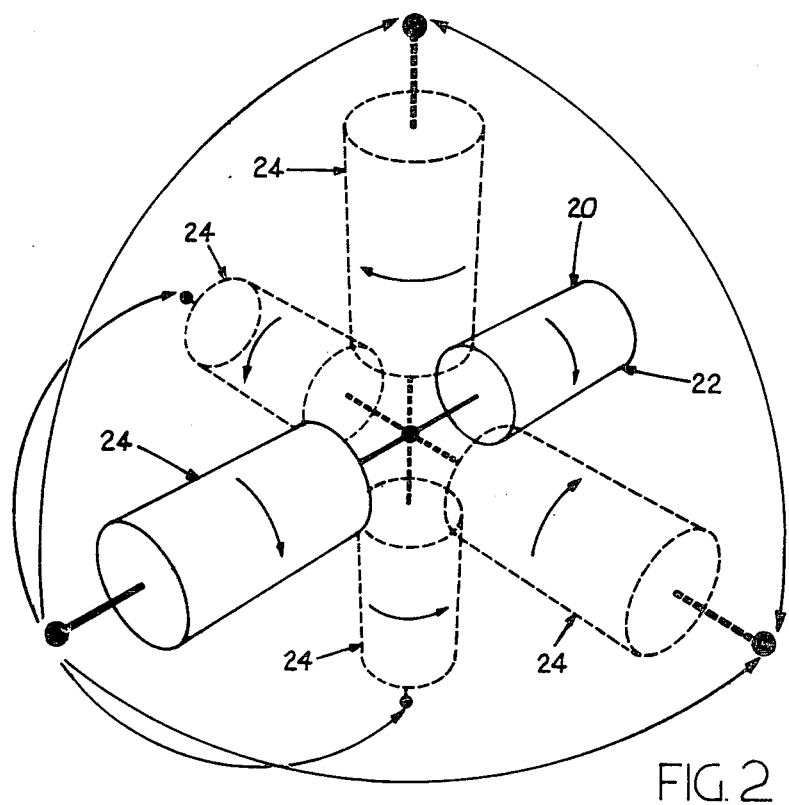
FIG. 2 diagrammatically illustrates the hemispherical possible radial directions of the driven shaft when this coupler assembly joins the driving and driven shafts.
Figure 3:
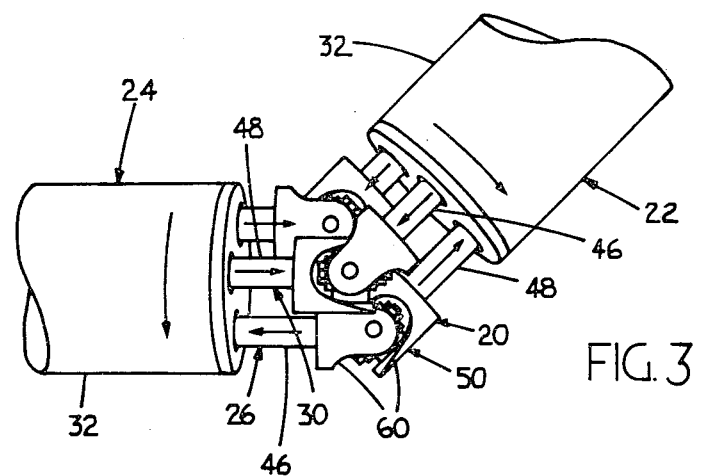
FIG. 3 is a partial enlarged perspective view of the coupler assembly, similar to FIG. 1, showing, however, the intersection at forty-five degrees.
Figure 4:
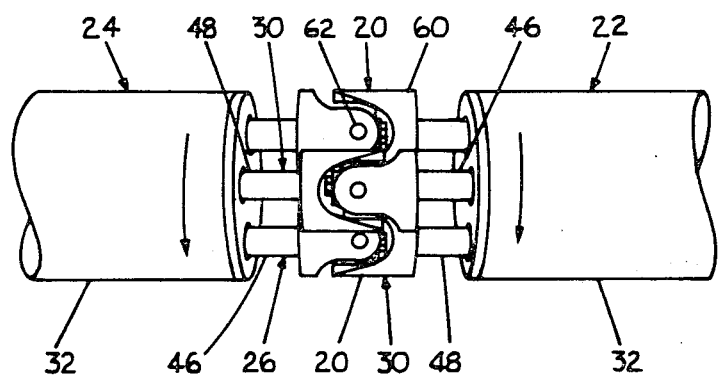
FIG. 4 is a partial enlarged perspective view of the coupler assembly, similar to FIGS. 1 and 3 showing, however, the in line position of the extended centerlines of the driving and driven shafts.

A preferred embodiment of the coupler assembly 20 joining a driving shaft 22 to a driven shaft 24 for constant velocity transmission of rotary power and motion, during their relative positioning, varying from zero degree in line to ninety degrees angularity, as selected throughout a hemisphere of radial shaft directions, is illustrated throughout the drawings. In FIG. 1, the coupler assembly 20 is shown, in part, in a perspective view illustrating a ninety degree position between the driving shaft 22 and driven shaft 24, i.e. a ninety degree relationship between the extended centerlines of these respective shafts. This ninety degree position is only one of many as indicated schematically in FIG. 2, wherein only the shaft portions 22 and 24 are illustrated, with dotted lines indicating only four of the many positions, the driven shaft 24 may be in, throughout a hemisphere, during the constant velocity transmission of rotary power and motion, via this coupler assembly 20. In FIGS. 3 and 4, similar to FIG. 1, the coupler assembly 20 is shown respectively in a forty five degree position, and in a zero degree position, between the driving shaft 22 and the driven shaft 24.

UTILIZATION OF FOUR PAIRS OF YOKES OR LINKS

The transmission of rotary power and motion via this coupler assembly 20 is undertaken through the utilization of four pairs of yokes or links. Two pairs 26 are movably confined by rocker assembly 28 and two pairs 30 are not so confined, with respect to one shaft, for example, the driven shaft 24. Then with respect to the driving shaft 22, the two pairs 26 are not confined and the two pairs 30 are confined by a rocker assembly 28. These four pairs of yokes or links are equally spaced both radially and circumferentially about the respective centerlines of the driving shaft 22 and driven shaft 24, as illustrated in FIGS. 1, 2, 3, and 4, etc.

SLIDABLE AND ROTATABLE POSITIONING OF THE FOUR PAIRS OF YOKES OR LINKS UTILIZING BALL BEARINGS

Both the entire driving shaft 22 and driven shaft 24 terminate in respective overall cylindrical bodies 32, each having in turn four individual cylinders 34, equally spaced both radially and circumferentially about the respective centerlines of the respective shafts 22, 24. Each of the four individual cylinders 34 having effective longitudinal areas of their internal volume lined with circulating bearing balls 38 movable about a bearing race 40. The rod portions 36 of both the confined yokes 46 and not confined yokes 48 slide and rotate while being supported by these bearing balls 38 which move about the bearing race 40.

ACTIVE PIVOTAL CONFINEMENT OF PAIRS OF YOKES OR LINKS VIA A ROCKER ASSEMBLY

Also within each respective overall cylindrical body 32 within a large cylindrical volume 42 beyond the four individual cylinders 34, is a pivotal mounting of a rocker assembly 28, which confines or limits the travel of pairs of yokes. With respect to one shaft, for example, the driven shaft 24, two pairs of yokes 26 are movably confined by rocker assembly 28, and two pairs of yokes 30 are not confined. Then with respect to the driving shaft 22, the two pairs of yokes 26 are not confined and the two pairs of yokes 30 are confined by a rocker assembly 28.

LINKING INTERCONNECTION OF EACH PAIR OF YOKES OR LINKS

Each pair of yokes or links 26 or 30, have a linking interconnection 50 between their respective yokes or links 46, which are confined by the rocker assembly 28, and the other opposite yokes or links 48, which are not confined. The yokes or links 46 are longer inside the large cylindrical volume 32 for movable attachment by roller bearings 52 and flanges 54 to the rocker arms 56 of the rocker assembly 28. All the yokes or links, 46, 48 have at their other ends for their linking interconnection 50, projecting, spaced, opposed, confronting, arms 60, which are equipped with ball pins 62. Upon assembly of the interconnection 50, hubs 64 are positioned to rotatably confine the ball pins 62 and they are so held by rivets 66.

OVERALL MOTIONS OF THE MAJOR COMPONENTS OF THE COUPLER ASSEMBLY

Figure 9:
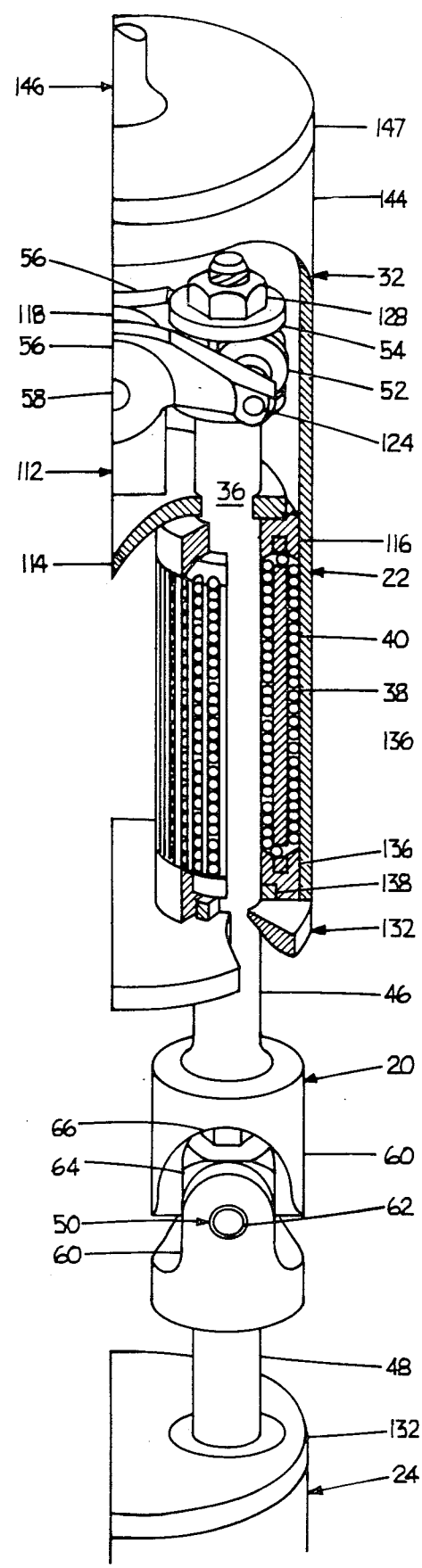
FIG. 9 is a partial perspective view, with portions removed, of the coupler assembly with the extended centerlines of the driving and driven shafts being in line, with only one pair of interconnected yokes or links, being shown for clarity and understanding, as they are movably confined by a respective rocker assembly, and a ball bearing race assembly with the bearing balls, within an individual cylinder of the overall cylindrical body being shown which receives the rod end of a respective yoke or link.

When power and/or motion is being transmitted from the driving shaft 22, through the coupler assembly 20, to the driven shaft 24, when their respective centerlines are in line, as viewed in FIGS. 4 and 9, all the pairs of yokes rotate and none of their yokes or links, 46 or 48, slide in or out, with respect to the bearing balls 38 and ball bearing races 40 of the cylinders 34 in the overall cylindrical bodies 32. Essentially all the components revolve in this in line configuration as they would if they were permanently secured to one another.

Figure 8:
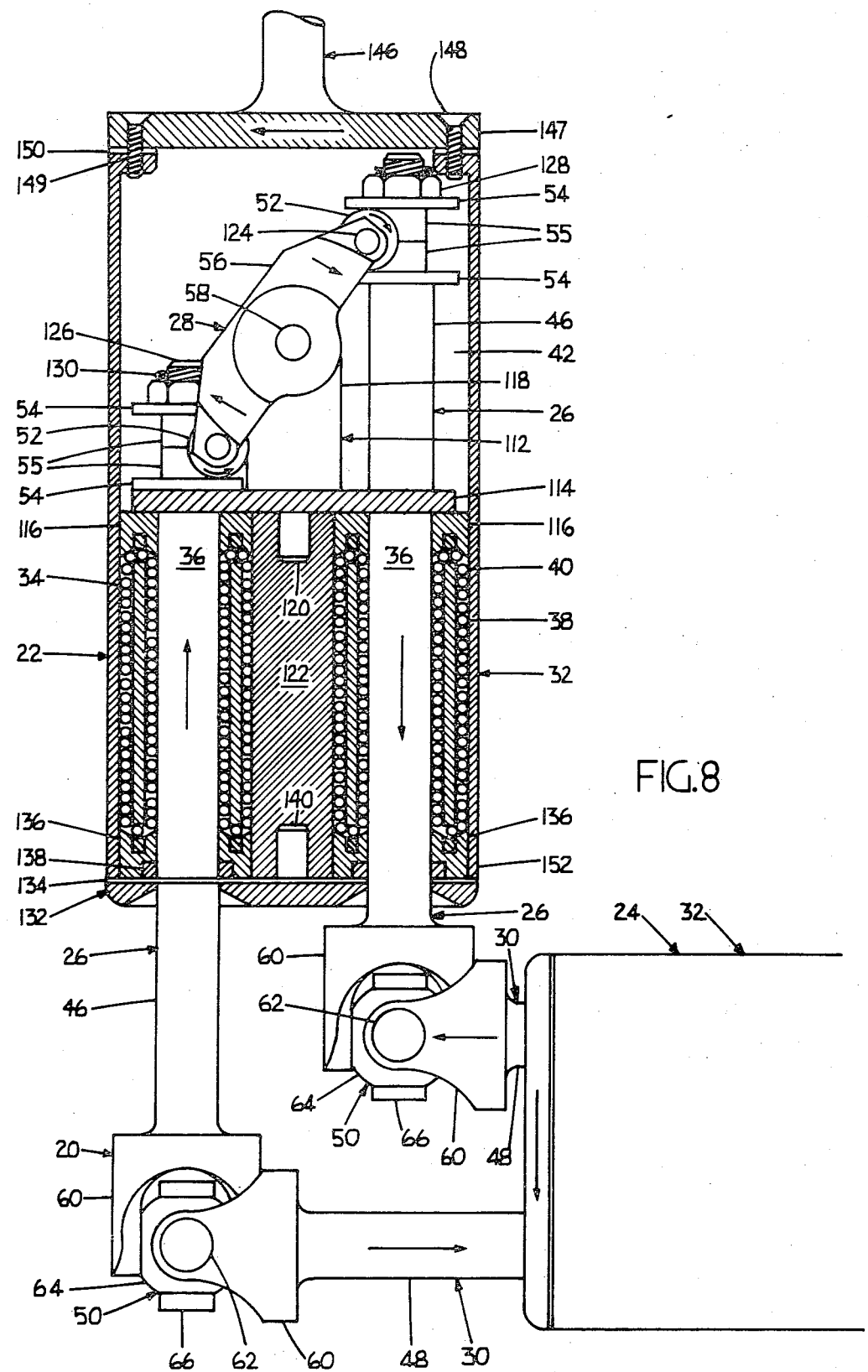
FIG. 8 is a partial plan view, with portions removed, of the coupler assembly with the extended centerlines of the driving and driven shafts intersecting at ninety degrees, with only two pairs of interconnected yokes or links being shown, for clarity and understanding, as they are movably confined by rocker assemblies of the respective driving or driven shafts, and with the other two pairs of interconnected yokes or links, not being shown, as they are not confined by any rocker assemblies or any other confining components, and the bearing balls and ball bearing race assemblies within the individual cylinders of the overall cylindrical body being shown which receive the rod ends of the respective yokes or links.

However, when the respective shaft centerlines are no longer in line at any non alignment angle, then there are yoke or link 46, 48 sliding and rotary movements occurring at all operating times. Many such non alignment angular positions are indicated schematically in FIG. 2, there being a multitude of radial positions throughout a hemisphere. In FIGS. 1 and 8, a ninety degree relative position of the driving shaft 22 to the driven shaft 24 is illustrated. In FIG. 3 a forty-five degree relative position is shown.

During all movements of the coupler assembly, from in line throughout all angular positions of the driving shaft 22 and the driven shaft 24, all the ball pins 62 of the linking interconnection 50, remain in a common geometric plane. Thus the coupler assembly is always transmitting rotary power and/or motion at a constant velocity. The linking interconnections 50 allow the full angular movement from zero to ninety degrees between the connected yokes 46, 48 of the respective pairs of yokes 26, 30, in either direction, i.e. one hundred and eighty degrees of movement. Consequently, the overall relative movements of the driving shaft 22 to the driven shaft 24 selectively occur throughout a hemisphere.

MANY APPLICATIONS FOR THE COUPLER ASSEMBLY

Figure 5:
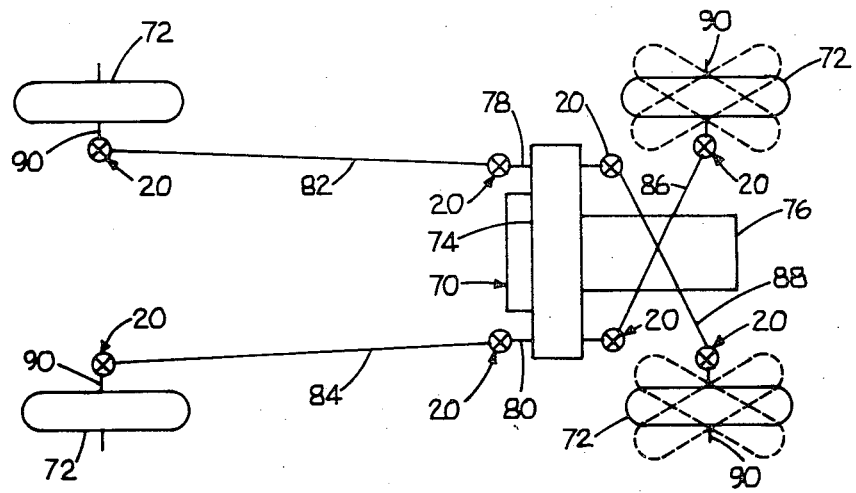
FIGS. 5, 6, and 7 schematically show how this coupler assembly interconnects the driving and driven shafts of a roadway vehicle in FIG. 5, of a tractor and agricultural implement in FIG. 6, and of a boat or ship in FIG. 7.
Figure 6:
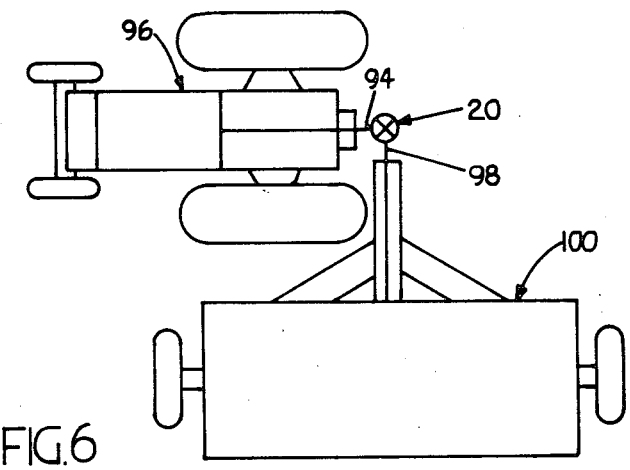
Figure 7:
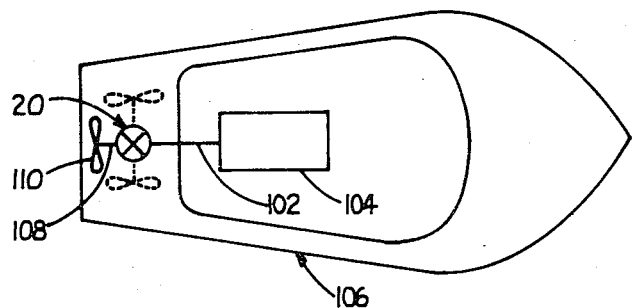

In FIGS. 5, 6, 7, applications for the coupler assembly 20 are schematically illustrated to indicate some of the many varied applications or installations wherein rotary power and/or motion is transmitted throughout a hemisphere. In FIG. 5, a four wheel drive vehicle 70 is shown equipped with eight coupler assemblies 20. At transmission 74 of an engine 76, respective left and right engine drive shafts 78, 80, rotate power distribution shafts 82, 84, 86, 88, through four respective coupler assemblies 20. These power distribution shafts in turn rotate wheel axle shafts 90 at the wheels 72 through four respective coupler assemblies 20.

In FIG. 6, a coupler assembly 20 is shown being used in transmitting power and motion between a power take off shaft 94 of a tractor 96 and a power receiving shaft 98 of farm machinery 100. A ninety degree operating position of the coupler assembly 20 is illustrated with respect to the hemisphere of possible positions. In FIG. 7, a coupler assembly 20 is illustrated being used in transmitting power and motion between a drive shaft 102 of an engine 104 in a boat 106 and a shaft 108 of a propeller 110, with motion arrows indicating the 180 degree possible movement in a horizontal plane. Also there are other possible radial movements within a hemisphere of radial movements.

OTHER COMPONENTS OF THIS PREFERRED EMBODIMENT AS ASSEMBLED IN THE COUPLER ASSEMBLY

In FIG. 8, although only one rocker arm 56 is visible there is another directly in line with it, as shown in FIG. 9. They both rotate about shaft 58 which with bearings, not shown, is supported on a flanged post 112. There is a flange 114 on this flanged post 112 which positions the ball bearing races 40, by holding their bearing caps 116 in place. Opposite its post 118 portion, it has an insert portion 120 for tightly interfitting with a central cylindrical recess 122 of the overall cylindrical body 32. It is also held in place by screws, not shown.

The four roller bearings 52, only two being visible on FIG. 8, while confined by flanges 54, rotate about cantilevered shafts 124, only two being visible in FIG. 8. The flanges 54, with their integral spacers 55, are held on the threaded ends 126 of the confined yokes or links 46 by using nuts 128 and cotter pins 130.

The opposite ends of the ball bearing races 40 are positioned by the cover plate 132, which holds the bearing caps 136 in place, with an included gasket 134. These bearing caps 136 have a circular recess to receive a circular seal 138. The cover plate 132 also has an insert portion 140 for tightly interfitting with the central cylindrical recess 122 of the overall cylindrical body 32. It is also held in place by screws, not shown.

At the rocker motion end 144 of each overall cylindrical body 32, a flanged reduction shaft 146 is secured with screws 148, passing through its flange 147, after a circular gasket 150 has first been installed. This rocker motion end 144 is essentially open, when the flanged reduction shaft 146 is removed, providing access to the rocker assembly 28.

SOME OF THE COMPONENTS OF THIS PREFERRED EMBODIMENT BEFORE BEING ASSEMBLED IN THE COUPLER ASSEMBLY

Figure 10:
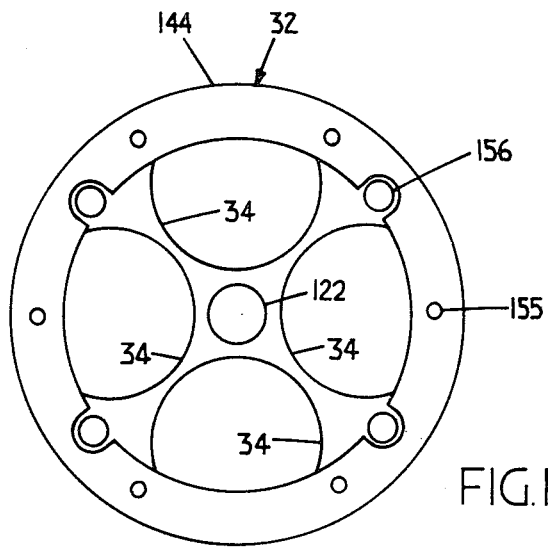
FIGS. 10, 11 and 12, illustrate in end views and in a longitudinal sectional view one of the overall cylindrical bodies, which receive most of the components of the coupler assembly.
Figure 11:
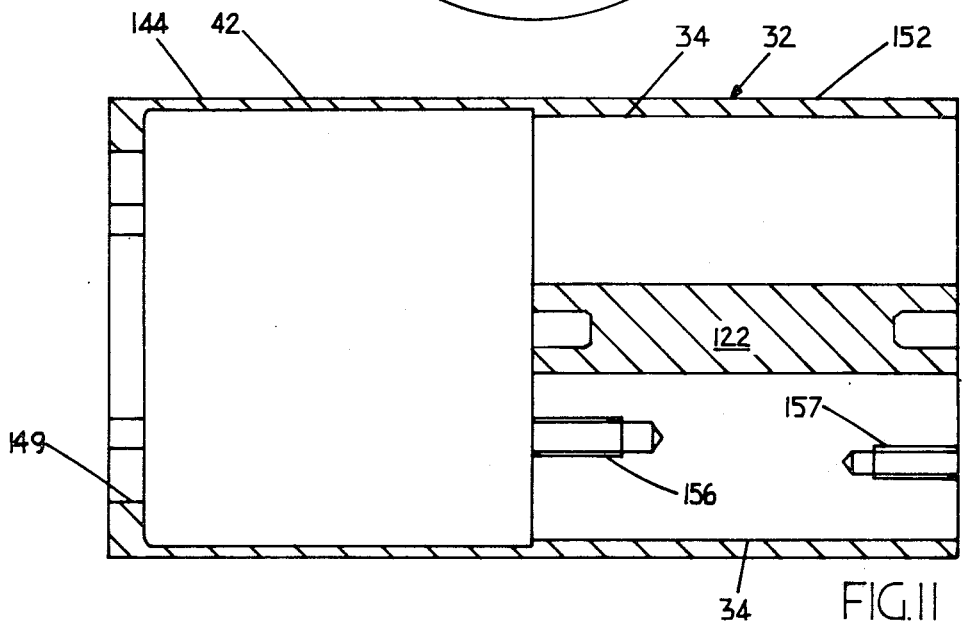
Figure 12:
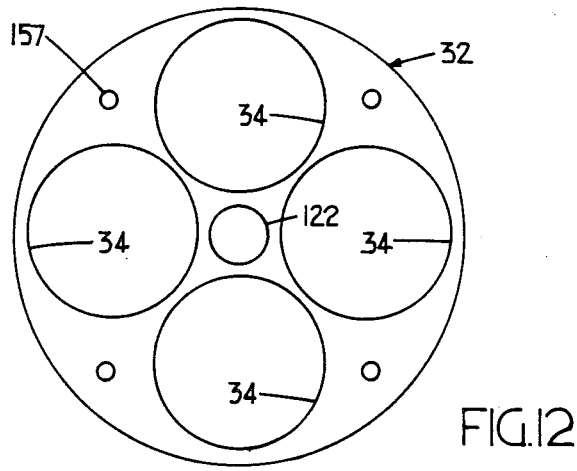

In FIGS. 10, 11 and 12, the overall cylindrical body 32 is illustrated. FIG. 10 is a view into its rocker motion end 144. FIG. 11 is a longitudinal sectional view to show the large cylindrical volume 42, in which the rocker assembly 28 is later installed, and two of the four cylinders 34, in which the ball bearing races 40, bearing balls 38, and bearing caps 116 and 136 are later installed. FIG. 12 is a view into the yoke end 152 of the overall cylindrical body 32. The center cylindrical recess 122 of this cylindrical body 32 subsequently receives the cylindrical insert 120 of the flanged post 112, and the cylindrical insert 140 of the cover plate 132. Threaded recesses 156 in the overall cylindrical body 32 receive fasteners, not shown, to hold the flanged post 112 and the cover plate 132 in place, completing their securement first started by using the cylindrical inserts 120, 140.

In FIGS. 13 and 14, the end view and side view of the flanged post 112 are respectively shown to indicate its cylindrical insert 120 for entry into the cylindrical recess 122 of the overall cylindrical body 32, and its post 118 with a hole 158 to receive a shaft 58 of the rocker assembly 28. Also circular openings 160 are provided to accommodate yokes or links 48, which are not confined, and larger slot openings 162 are provided to accommodate yokes or links 46, which are guided by the rocker assembly 28.

In FIGS. 15 and 16 a side view and an end view respectively illustrate one of the two rocker arms 56 of the rocker assembly 28 pivotally mounted on the flanged post 112 in the large cylindrical volume 42 of the overall cylindrical body 32. The rocker assembly 28 movably monitors the confined yokes or links 46. The holes 166 in the ends of the rocker arms 56 receive the cantilevered shafts 124 on which roller bearings 52 are mounted. The center hole 168 receives the shaft 58.

In FIGS. 17, 18, and 19, a threaded end view, a longitudinal side view, and a confronting arms end view, are respectively shown of a confined yoke or link 46. The non confined yoke or link 48 is essentially the same, but does not have the threaded end 172. Each of the confronting arms 60 have a hole 174 to receive a ball pin 62 used in the linking interconnection 50. All the yokes or links have a common rod portion 36 which slides and rotates within the cylinders 34.

In FIGS. 20 and 21 a ball pin 62 is shown respectively in a side view and an end view. Its cylindrical pin portion 178 is received in a hole 174 of each confronting arm 60. Its ball portion 180 is subsequently fitted into a receiver portion 182 of a hub 64.

In FIGS. 22 and 23 a hub 64 is illustrated respectively in a side view and an end view. Its receiver portions 182 rotatably receive portions of the ball portions 180 of ball pins 62. Its central passageway 184 receives rivet 66.

In FIGS. 24 and 25, the ball bearing race 40 is shown in a longitudinal sectional view and an end view. The ball track guides 188, formed like gear teeth, guide the ball bearings 38 longitudinally between their entry and exit from their transverse crossover passageways 190.

I claim:

1. A coupler assembly to join a driving shaft to a driven shaft for constant velocity transmission of rotary power and/or motion during their relative positioning varying from zero degree in line to ninety degrees angularity as selected throughout a hemisphere of possible radial shaft directions, comprising:
   a. a plurality of paired yokes radially and circumferentially spaced about respective longitudinal centers of cylindrical bodies in turn adapted to be joined to a driven shaft and a driven shaft, each yoke having a rod portion partially confined for rotatable, slideable, and/or reciprocal movement through a cylinder formed in a cylindrical body, paired rod portions, and each yoke having a cantilevered extending connectable end, having in turn a pair of opposing confronting arms, each arm having in turn a pin positioned ball for linking interconnection with a like pin positioned ball of a paired yoke;
   b. multi-sectioned hubs secured about the respective groupings of like pin positioned balls to respectively interconnect each of the respective pairs of yokes;
   c. two cylindrical bodies adapted to be joined to a driving shaft and a driven shaft, each having cylinders radially and circumferentially spaced about the center line to rotatably, slideably, and reciprocally partially receive the rod portions of the yokes and each having a larger interior cylinder to variably surround the projecting ends of the rod portions during movements of the yokes relative to the individual cylindricals;
   d. said rod ends having upper and lower rocker restraining means; and,
   e. rocker assemblies in said larger interior cylinder, said rocker assemblies frictionally mounted between said upper and said lower rocker restraining means.

2. A coupler assembly, as claimed in claim 1, wherein each of the radially and circumferentially spaced cylinders of each cylindrical body have ball bearing interiors to receive, guide, and support a respective rod portion of a yoke.

3. A coupler assembly, as claimed in claim 1, wherein each cylindrical body has sealable end members, with one end member receiving the rod portions of the yokes, and with the other end member adapted for interconnection to a shaft, either the driving shaft or the driven shaft.

4. A coupler assembly to join a driving shaft to a driven shaft for constant velocity transmission of rotary power and/or motion during their relative positioning varying from zero degree in line to ninety degrees angularity as selected throughout a hemisphere of possible radial shaft directions, comprising:
   a. four pair of yokes radially and circumferentially spaced about respective longitudinal centers of cylindrical bodies in turn adapted to be joined to a driving shaft and a driven shaft, each yoke having a rod portion partially confined for rotatable, slideable, and/or reciprocal movement through a cylinder formed in a cylindrical body, paired rod portions, and each yoke having a cantilevered extending connectable end, having in turn a pair of opposing confronting arms, each arm having in turn a pin positioned wall for linking interconnection with a like pin positioned ball of a paired yoke;
   b. multi-sectioned hubs secured about the respective groupings of like pin positioned balls to respectively interconnect each of the respective pairs of yokes;

c. two cylindrical bodies adapted to be joined to a driving shaft and a driven shaft, each having four internal cylinders radially and circumferentially spaced about the centerline to rotatably, slideably, and reciprocally partially receive the rod portions of the yokes and each having a larger interior cylinder to variably surround the projecting ends of the rod portions during movement of the yokes relative to the individual cylinders;

d. said rod ends having upper and lower rocker restraining means; and, e. four rocker assemblies in said larger interior cylinder, said rocker assemblies frictionally mounted between said upper and lower rocker restraining means.

* * * * *